(12) United States Patent
Lo (10) Patent No.: US 11,665,335 B2
(45) Date of Patent: May 30, 2023

(54) CONFERENCE ROOM INTELLIGENT MANAGEMENT METHOD AND INTELLIGENT CONFERENCE ROOM SYSTEM

(71) Applicant: AmTRAN Technology Co., Ltd., New Taipei (TW)

(72) Inventor: Kuo Chih Lo, New Taipei (TW)

(73) Assignee: AmTRAN Technology Co., Ltd., New Taipei (TW)

(\*) Notice: Subject to any disclaimer, the term of this patent is extended or adjusted under 35 U.S.C. 154(b) by 16 days.

(21) Appl. No.: 17/580,618

(22) Filed: Jan. 20, 2022

(65) Prior Publication Data

US 2022/0329777 A1 Oct. 13, 2022

(30) Foreign Application Priority Data

Apr. 8, 2021 (TW) .................. 110112798

(51) Int. Cl.
| | |
|---|---|
| *H04L 65/403* | (2022.01) |
| *H04N 17/00* | (2006.01) |
| *H04R 29/00* | (2006.01) |
| *H04N 23/698* | (2023.01) |

(52) U.S. Cl.
CPC ......... *H04N 17/002* (2013.01); *H04L 65/403* (2013.01); *H04N 23/698* (2023.01); *H04R 29/001* (2013.01)

(58) Field of Classification Search
CPC ............. H04L 65/1073; H04L 65/1069; H04L 65/403; H04N 17/002; H04N 23/698; H04R 29/001; H04R 27/00

USPC ............................................ 348/14.01–14.16
See application file for complete search history.

(56) References Cited

U.S. PATENT DOCUMENTS

| | | | |
|---|---|---|---|
| 10,237,546 B2\* | 3/2019 | De La Paz ........... | H04N 17/004 |
| 2018/0332261 A1\* | 11/2018 | Zhang .................. | H04N 1/6044 |

FOREIGN PATENT DOCUMENTS

| | | | |
|---|---|---|---|
| CN | 111866497 A | | 10/2020 |
| CN | 112415971 A | | 2/2021 |
| JP | 10191297 A | \* | 7/1998 |
| TW | 201116840 A | | 5/2011 |

\* cited by examiner

*Primary Examiner* — Melur Ramakrishnaiah
(74) *Attorney, Agent, or Firm* — CKC & Partners Co., LLC (57) ABSTRACT

A conference room intelligent management method, executing a self-inspecting process before a conference starts The self-inspecting process is configured to automatically detect a camera device, a radio device, a speaker and a lighting device arranged in the conference room, and has operations comprising: controlling the camera device to capture a testing image corresponding to a self-inspecting image; determining whether the camera device is abnormal, and generating a abnormal testing signal when determining the camera device is abnormal; controlling the speaker to receive a sampling audio signal corresponding to the self-inspecting audio signal; determining whether the speaker is abnormal, and generating the abnormal testing signal when determining the speaker is abnormal; and transmitting the abnormal testing signal to an electronic device to notify, and removing an abnormal situation of the conference room device before the conference starts.

22 Claims, 7 Drawing Sheets

- S505: controlling the display device to display a self-inspecting image, and controlling the camera device to capture the testing image corresponding to the self-inspecting image
- S510: the camera device is abnormal? — yes → S580; no ↓
- S515: controlling the speaker to generate a self-inspecting audio signal, and controlling the radio device to receive a sampled audio signal corresponding to the self-inspecting audio signal
- S520: the radio device or the speaker is abnormal? — yes → S580; no ↓
- S525: controlling the camera device to capture the panoramic image of the conference room to analyze the ambient brightness and the color temperature of the conference room, and controlling the brightness and the color temperature of the lighting device to adjust the ambient brightness and the color temperature to a target value
- S530: the lighting device is abnormal? — yes → S580; no ↓
- S535: controlling the display device to generate a instruction message, so that the tester performs an action according to the instruction message, and determining whether the action signal corresponding to the action is received generated by an action sensing device arranged in the conference room, so as to detect whether the action sensing device is operating normally
- S540: the action sensing device is abnormal? — yes → S580; no ↓
- S560: the self-inspecting process is finished, the intelligent conference room system is at a standby state
- S580: generating the abnormal testing signal

CONFERENCE ROOM INTELLIGENT MANAGEMENT METHOD AND INTELLIGENT CONFERENCE ROOM SYSTEM

CROSS-REFERENCE TO RELATED APPLICATION

This application claims priority to Taiwan Application Serial Number 110112798, filed Apr. 8, 2021, which is herein incorporated by reference in its entirety.

BACKGROUND

Technical Field

The present disclosure relates to a management method and system, and particularly relates to an conference room intelligent management method and intelligent conference room system.

Description of Related Art

Video conferencing products currently on the market require users to have a certain level of technology and skills in order to smoothly install, operate, detect problems and eliminate obstacles. For general users, it is easy to be at a loss in the conference room because they do not know how to operate the equipment. Furthermore, even if the user is already familiar with the operation method of the equipment, due to the diversification of brands of video conferencing products, it is impossible to guarantee the normal operation of every conference. If the above obstacles are removed by the engineers at the beginning of the conference, it will waste all participants' time and create a negative impression on customers, guests or superiors. In addition, the conference notification process of the existing system is too complicated, and each system is independent of each other. For example, the e-mail system can only transmit conference notices, while booking a conference room requires another independent system. The independent systems increase the inconvenience of operation.

Accordingly, how to improve the conference efficiency and quality of the video conferencing system is a technical problem for those skilled in the art.

SUMMARY

Summary is used to provide a simplified description of the present disclosure, so that readers have a basic understanding of the present disclosure. This content of summary is not a complete description of the present disclosure, and it does not point out the important/key elements of the embodiments of the present disclosure, or define the scope.

One aspect of the present disclosure is a conference room intelligent management method, comprising: executing, by a main-control device configured in a conference room, a self-inspecting process before a conference starts, wherein the self-inspecting process is configured to automatically detect a camera device, a radio device, a speaker and a lighting device arranged in the conference room, and operations of the self-inspecting process comprises: controlling a display device to display a self-inspecting image, and controlling the camera device to capture a testing image corresponding to the self-inspecting image; determining whether the camera device is abnormal according to the self-inspecting image and the testing image, and generating a abnormal testing signal when determining the camera device is abnormal; controlling the speaker to generate a self-inspecting audio signal, and controlling the speaker to receive a sampling audio signal corresponding to the self-inspecting audio signal; determining whether the speaker is abnormal according to the sampling audio signal and the self-inspecting audio signal, and generating the abnormal testing signal when determining the speaker is abnormal; and transmitting the abnormal testing signal to an electronic device to notify, and removing an abnormal situation of the conference room device before the conference starts.

Another aspect of the present disclosure is an intelligent conference room system, comprising a camera device, a radio device, a speaker, a lighting device and a main-control device. The main-control device is communicatively connected to the camera device, the radio device, the speaker and the lighting device. The main-control device, the camera device, the radio device, the speaker and the lighting device are arranged in a conference room. The main-control device is configured to execute a self-inspecting process before a conference starts to automatically detect the camera device, the radio device, the speaker and the lighting device. The main-control device is configured to: control a display device to display a self-inspecting image, and control the camera device to capture a testing image corresponding to the self-inspecting image; determine whether the camera device is abnormal according to the self-inspecting image and the testing image, and generate a abnormal testing signal when determining the camera device is abnormal; control the speaker to generate a self-inspecting audio signal, and control the speaker to receive a sampling audio signal corresponding to the self-inspecting audio signal; determine whether the speaker is abnormal according to the sampling audio signal and the self-inspecting audio signal, and generate the abnormal testing signal when determining the speaker is abnormal; and transmit the abnormal testing signal to an electronic device to notify, and removing an abnormal situation of the conference room device before the conference starts.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
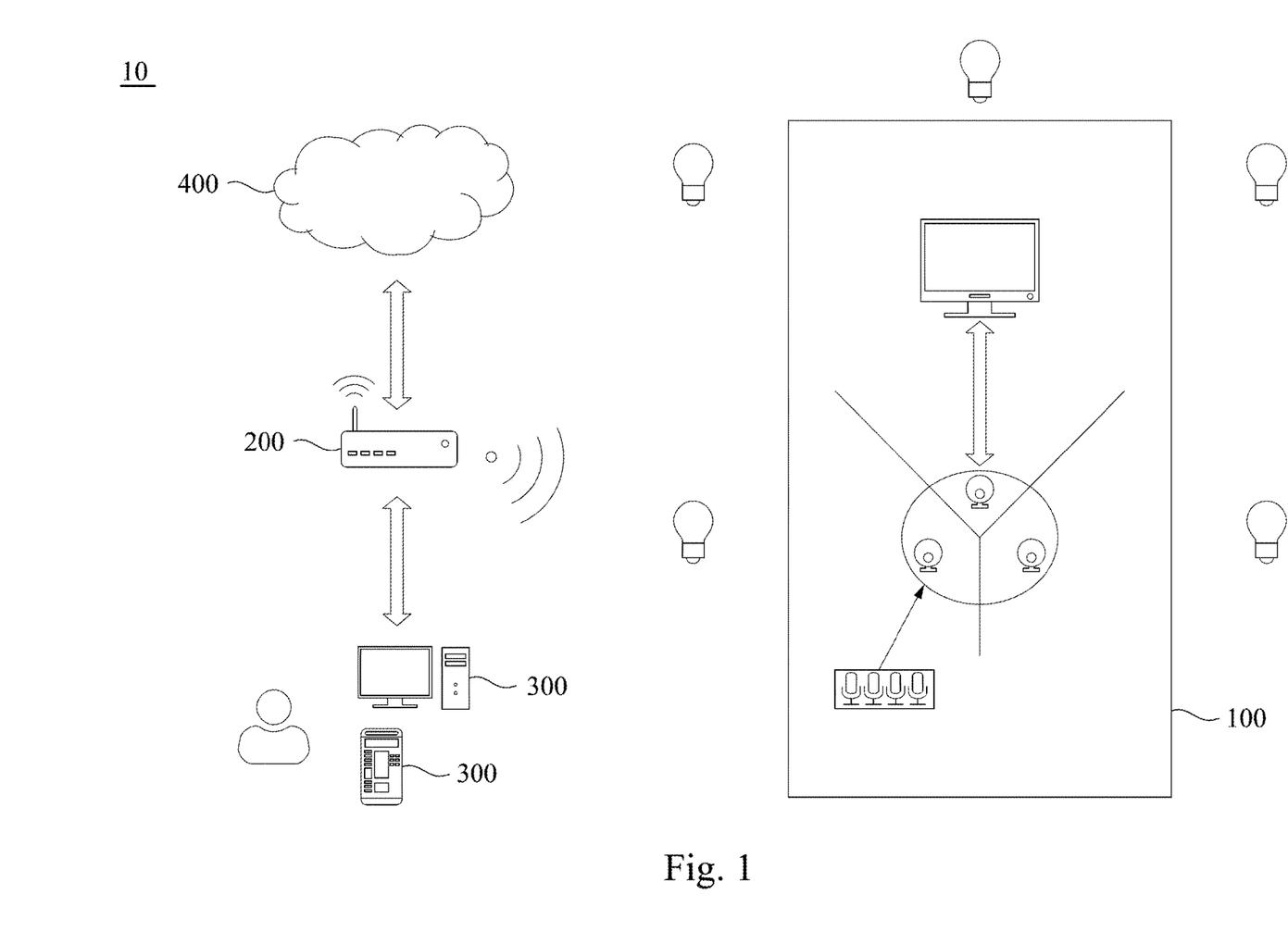
FIG. 1 is a schematic diagram of a management system 10 configured to manage a intelligent conference room system 100 in some embodiments of the present disclosure.

FIG. 1 is a schematic diagram of a management system 10 configured to manage a intelligent conference room system 100 in some embodiments of the present disclosure. As shown in FIG. 1, the management system 10 includes a intelligent conference room system 100, a gateway device 200, an electronic device 300 and a cloud server 400. The intelligent conference room system 100 communication coupled to the gateway device 200. The electronic device 300 communication coupled to the gateway device 200. The gateway device 200 communication coupled to the cloud server 400. In some embodiments, the intelligent conference room system 100 is respectively arranged in every conference room of the company. The management system 10 may include multiple intelligent conference room systems 100, so that every conference room of the company may have a corresponding intelligent conference room system 100. In order to explain the content concisely, an intelligent conference room system 100 is used as a example in the following paragraphs, and the present disclosure is not limited to this.

In some embodiments, the cloud server 400 is configured to manage the maintenance of multiple conference room devices of the intelligent conference room system 100, is configured to reserve and schedule of the intelligent conference room system 100, and is configured to monitor the conference status and remote conference of the conference room. The cloud server 400 can be a private cloud, public cloud, or hybrid cloud that is set up in the company's internal network. The cloud server 400 can use the functions of hosting services, such as data delivery services, data computing services.

In some embodiments, the intelligent conference room system 100, the gateway device 200, the electronic device 300 and the cloud server 400 is configured with a program to perform management operations associated with the conference room. For example, when the user wants to reserve the conference room, user can operate the program of the electronic device 300. The user can view and select an idle conference room and an idle time through the user interface to perform reservation, change or cancel registration of the conference room.

In some embodiments, the status data of the conference room is stored in a storage media (e.g. a status database) in the cloud server 400. For example, the program of the electronic device 300 performs the related operations of the conference room by accessing the status data of the conference room in the cloud server 400.

In some embodiments, device of the intelligent conference room system 100 can execute a self-inspecting process, so that the management system 10 monitors the maintenance and management of the intelligent conference room system 100. The self-inspecting process will be explained as follows.

Figure 2:
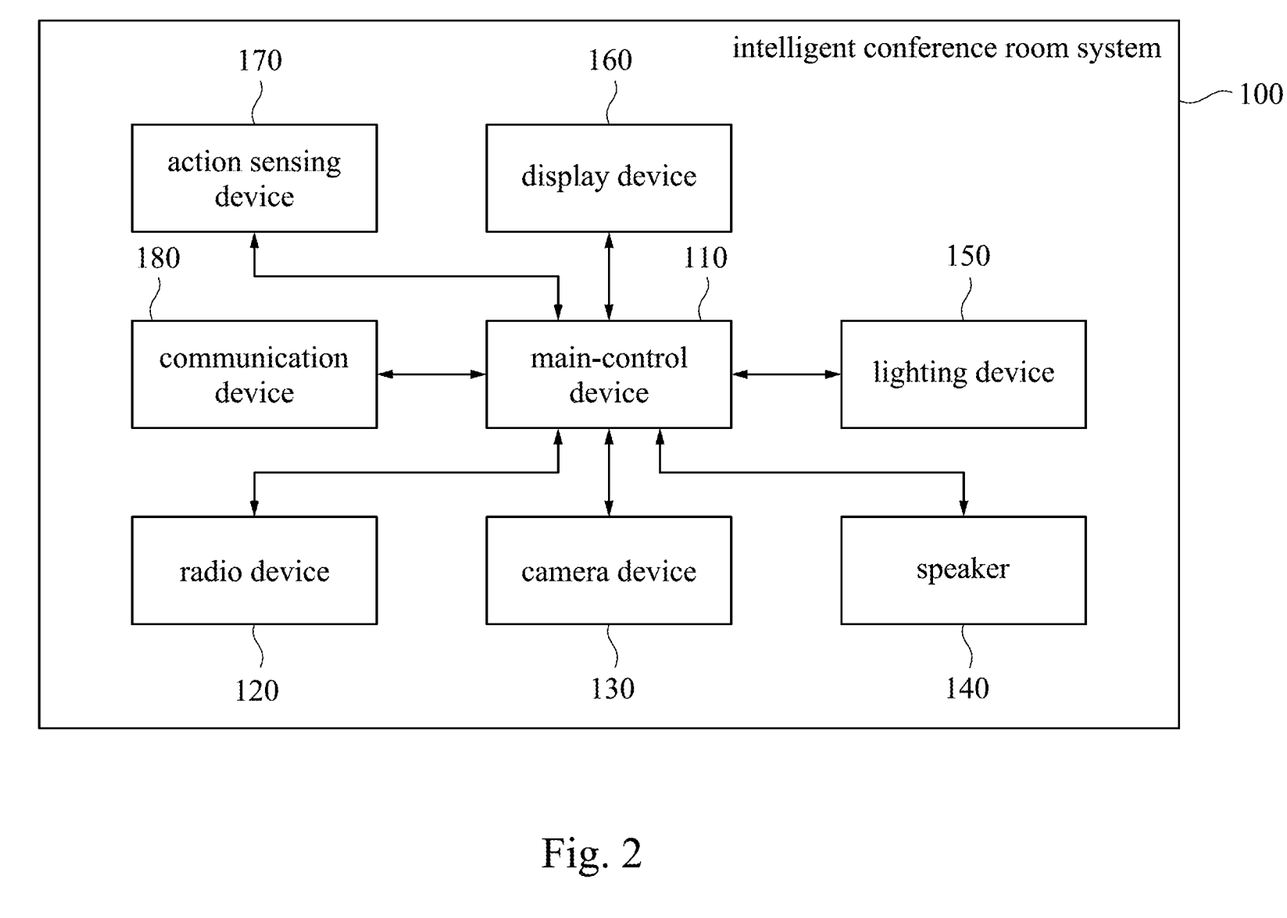
FIG. 2 is a element blocks diagram of the intelligent conference room system in some embodiments of the present disclosure.

FIG. 2 is a element blocks diagram of the intelligent conference room system 100 in some embodiments of the present disclosure. The intelligent conference room system 100 includes a main-control device 110, a radio device 120, a camera device 130, a speaker 140, a lighting device 150, a display device 160, a action sensing device 170 and a communication device 180. As shown in FIG. 2, the main-control device 110 is electrically or communicatively connected to the radio device 120, the camera device 130, the speaker 140, the lighting device 150, the display device 160, the action sensing device 170 and the communication device 180. In some embodiments, components in the intelligent conference room system 100 are set in the conference room to serve as the device required by the user during the conference.

In some embodiments, the camera device 130 can be implemented by a 360-degree camera to take a panoramic video in the conference room, such as each participant around the conference table. The speaker 140 can be implemented by a microphone array to capture the sound in the conference room.

In some embodiments, the intelligent conference room system 100 is connected to the gateway device 200 in FIG. 1 by the communication device 180 to connect to the electronic device 300 and the cloud server 400.

Figure 3:
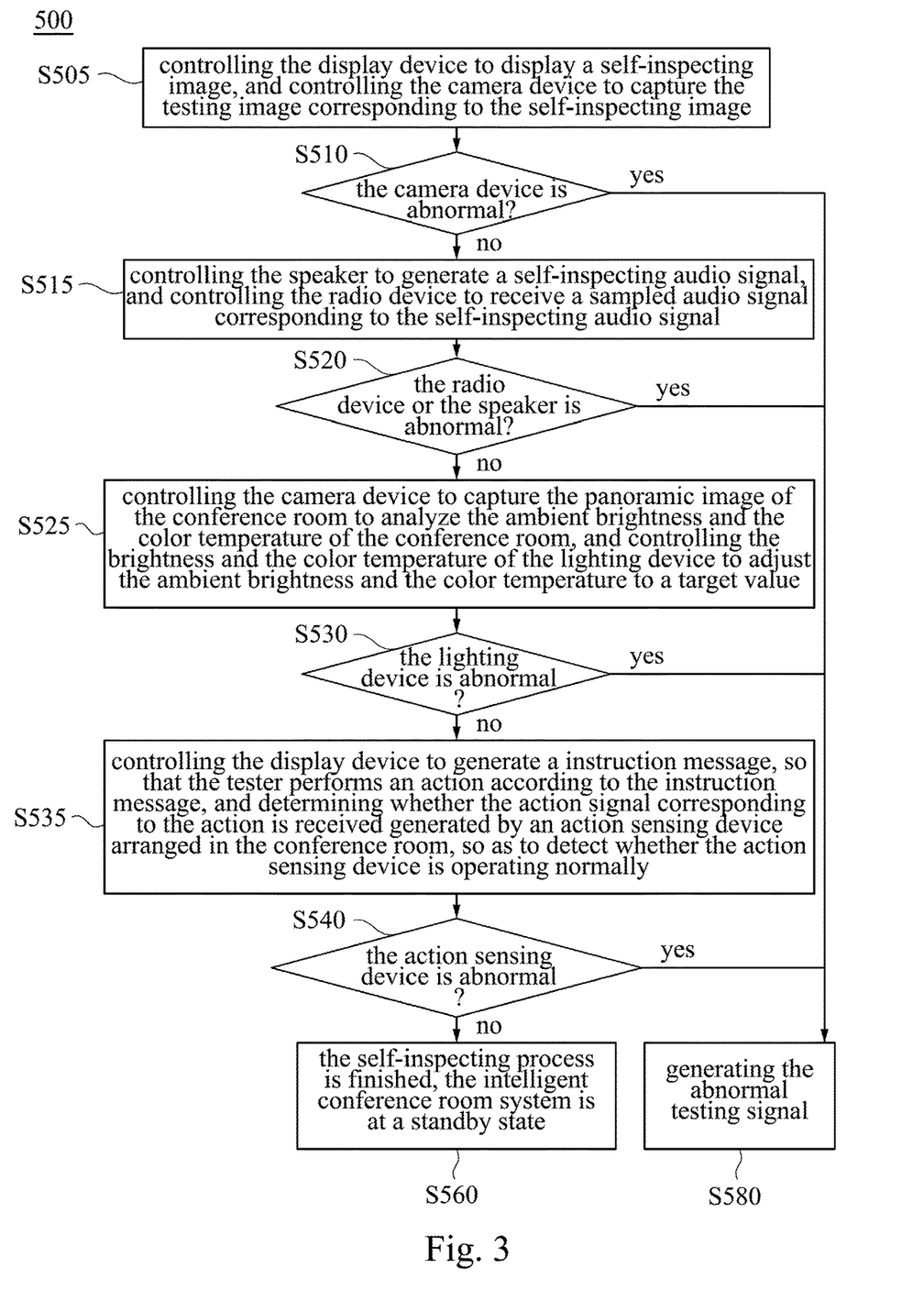
FIG. 3 is a flowchart illustrating a conference room intelligent management method in some embodiments of the present disclosure.

In order to understand the management of the intelligent conference room system 100, please refer to the components in FIG. 2 and the flowchart in FIG. 3 for the following description.

FIG. 3 is a flowchart illustrating a conference room intelligent management method 500 in some embodiments of the present disclosure. The conference room intelligent management method 500 includes the self-inspecting process executed when the components are installed in the conference room to detect whether the devices in the conference room have been properly installed to provide equipment functions. In some embodiments, after the user makes a reservation to the conference room, before a scheduled start time of the conference schedule, the intelligent conference room system 100 executes the self-inspecting process to detect whether devices in the conference room normally provides equipment functions. The purpose of the self-inspecting process is to provide the tester to debug or assist in checking whether it is installed correctly during the installation time, or to make the intelligent conference room system 100 self-inspect before the conference starts. If an abnormal function of the device is detected, a message will be sent to the tester immediately to eliminate the abnormality, and ensure that the conference can be started at the preset conference schedule. Accordingly, it is not necessary for the participant to eliminate the abnormality, and it also avoids that the process of eliminating the abnormality delays the preset conference schedule. The conference room intelligent management method 500 will be explained in detail in FIG. 3.

In step S505, controlling the display device 160 to display a self-inspecting image, and controlling the camera device 130 to capture the testing image corresponding to the self-inspecting image.

In some embodiments, the display device 160 display a self-inspecting image. The self-inspecting image can be an image including a specific pattern, color ratio, etc. In a normal installation/configuration environment, the camera device 130 will face the display device 160. During the test, the camera device 130 will capture a test image.

In step S510, determining whether the camera device 130 is abnormal according to the self-inspecting image and the testing image.

In some embodiments, in the program that determining whether the camera device 130 is normal (e.g., whether the installation is correct, whether the sensor chip is damaged, etc.), further determining whether the position of the self-inspecting image in the testing image meets a preset range. For example, determining whether the testing image covers the complete or partial self-inspecting image. If the testing image only captures part of the self-inspecting image, and/or the range of the self-inspecting image in the testing image is not within the preset range, determining the testing image is abnormal. That is, there is a problem with the installation position of the camera device 130 or the position was moved by the previous user after the installation. At this time, the self-inspecting process will determine that the camera device 130 is abnormal. In other embodiments, the self-inspecting process further uses the pixel value of the testing image to determine whether the camera device 130 is normal. The sensing function of the camera device 130 may different due to software settings or the function of the chip. In this embodiment, if it is further detected that the pixel value of the image does not meet a preset value (e.g., the color distribution does not match the human brain or viewing experience), it means that the camera device 130 is abnormal.

In some embodiments, if determining that the camera device 160 is abnormal in step S510, then perform step S580. In step S580, the main-control device 110 generates an abnormal testing signal, and transmit the abnormal testing signal to the electronic device 300 by the communication device 180. In some embodiments, the abnormal testing signal can be a push message sent to the electronic device 300. The push message records the conference room, equipment items and abnormal reasons of the abnormal device, so that the user (e.g., the tester) can obtain the information clearly and quickly and go to the target conference room to remove obstacles.

If determining that the camera device 130 is normal in step S510, then perform step S515.

In step S515, controlling the speaker 140 to generate a self-inspecting audio signal, and controlling the radio device 120 to receive a sampled audio signal corresponding to the self-inspecting audio signal. In some embodiments, the speaker 140 first plays a preset self-inspecting audio signal (e.g., a piece of music, voice, or the combination), and then the radio device 120 receives a sampled audio signal. When the function of the radio device 120 maintains normal operation, the signal content and signal value of the sampled audio signal will be the same or similar to the self-inspecting audio signal. Therefore, if the difference between the sampled audio signal and the self-inspecting audio signal is higher than an audio threshold, it means that the sound reception function of the radio device 120 may abnormal. In other embodiments, if the sampled audio signal detects abnormal, it may also be that the play function of the speaker 140 is abnormal.

In step S520, determining whether the radio device 120 is abnormal according to the self-inspecting audio signal and the sampled audio signal. In some embodiments, if determining the radio device 120 or the speaker 140 is abnormal in step 520, then performing step S580. The description of step S580 is as shown above, and will not be repeated here.

If determining the radio device 120 and the speaker 140 is normal in step 520, then performing step S525.

In step S525, controlling the camera device 130 to capture the panoramic image of the conference room to analyze the ambient brightness and the color temperature of the conference room, and controlling the brightness and the color temperature of the lighting device 150 to adjust the ambient brightness and the color temperature of the conference room to a target value. In some embodiments, the panoramic image can be used to analyze the ambient brightness in the conference room. For example, if the brightness of the overall image in the panoramic image is insufficient, or the color temperature affects the progress of the conference, or the brightness of a part of the image in the panoramic image is insufficient, or the color temperature is significantly different from the target value, controlling the overall brightness/the color temperature of the lighting device 150, or obtaining the position of the conference room in the corresponding part of the image according to the lack of the brightness in the panoramic image or the color temperature of the different part of the image, so as to control the brightness/the color temperature of the lighting device 150 in the position range. It should be noted that the lighting device 150 includes multiple lighting units, and the brightness and the color temperature of each lighting unit can be individually controlled. In step S530, determining whether the lighting device 150 is abnormal. In some embodiments, If the adjustment result still fails to reach the target value during the above adjustment of the brightness and the color temperature of one or more lighting units, it means that the lighting device 150 is abnormal.

If determining that the lighting device 150 is abnormal in step S530, then performing step S580. The description of step S580 is as shown above, and will not be repeated here.

If determining that the lighting device 150 is normal in step S530, then performing step S535.

In step S535, controlling the display device 160 to generate a instruction message, so that the tester performs an action according to the instruction message, and determining whether the action signal corresponding to the action is received by an action sensing device 170 arranged in the conference room, so as to detect whether the action sensing device 170 is operating normally. In some embodiments, when the tester installs the action sensing device 170, it needs to test whether the action sensing device 170 is operating normally. The tester can trigger the display device 160 through the user interface or physical buttons of the main-control device 110 or the electronic device 300. For example, the instruction message "please leave the conference room to detect the movement of the human body" is presented. After watching the message, the tester follow the message to leave the conference room, and then re-enter the conference room, so that the action sensing device 170 can determine whether the movement of the human body is detected during the test time. If the movement of the human body can be detected during the test time, it is determined that the function of the action sensing device 170 is normal.

After determining whether the action sensing device 170 is abnormal, if the action sensing device 170 is determined to abnormal in step S540, then performing step S580. The description of step S580 is as shown above, and will not be repeated here.

If the action sensing device 170 is determined to normal in step S540, in step S560, the self-inspecting process is completed, the intelligent conference room system is at a standby state. It should be noted that, step S505 and step S510, step S515 and step S520, step S525 and step S530, step S535 and step S540, the above four sets of steps can be executed in any order combination. The conference room intelligent management method 500 is not limited to the sequence of steps shown in FIG. 3.

Figure 4:
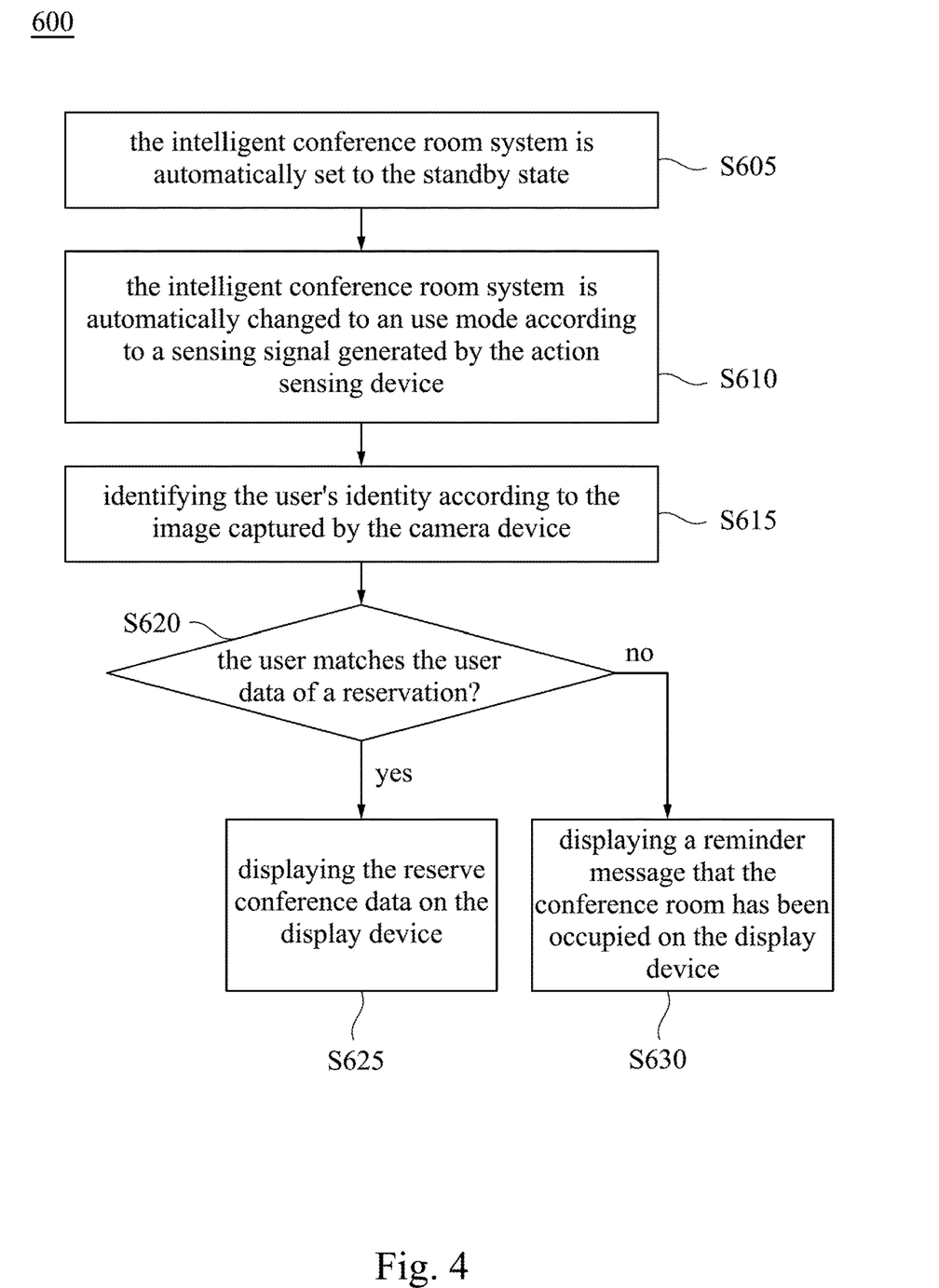
FIG. 4 is a flowchart illustrating a conference room intelligent management method in some embodiments of the present disclosure.

FIG. 4 is a flowchart illustrating a conference room intelligent management method 600 in some embodiments of the present disclosure. conference room intelligent management method 600 is configured to detect whether an idle conference rooms (i.e., not reserved for other conferences) is occupied by the user. In order to explain the conference room intelligent management method 600, please refer to the components in FIG. 2 and the flowchart in FIG. 4 for the following paragraphs.

In step S605, during the idle state, the intelligent conference room system 100 is automatically set to the standby state. In some embodiments, the intelligent conference room system 100 turns off the lighting device 150 and the display device 160 to save energy.

In step S610, the intelligent conference room system 100 is automatically changed to an use mode according to a sensing signal generated by the action sensing device 170. In some embodiments, if the user enters the conference room, the action sensing device 170 detects a human body signal. At this time, the intelligent conference room system 100 automatically activates the lighting device 150, the display device 160 and other equipment for participants.

In step S615, identifying the user's identity according to the image captured by the camera device 130. In some embodiments, the user entering the conference room may not reserve the conference room, so it can be confirm whether the conference room is in the correct schedule by identifying the identity of the user entering the conference room.

In step S620, determining whether the user matches the user data of a reservation. In some embodiments, the user data of a reservation can be the reserve registration data recorded in the database, such as the participant's name, employee number, biological characteristics, conference name, the conference room number. The image of step S615 will be used to compare the biological characteristics of the participant in the database, such as face recognition. If the participant data is searched, it means that the user entering the conference room is expected, and then step S625 is performed. If the participant data cannot be searched, it means that the user entering the conference room is not expected, and step S630 is executed.

In step S625, displaying the reserve conference data on the display device 160. For example, the person who enter are the conference room is a participate of the conference, so the conference data uploaded to the database in advance, such as conference schedule, the participant list, the conference data, will be downloaded to the intelligent conference room system 100 and displayed on the display device 160.

In step S630, displaying a reminder message that the conference room has been occupied on the display device 160. The user should abide by the rules. For those who need to use the conference room, they should register in the conference room. In this embodiment, if the user does not register with a reserve but occupies the conference room, this will affect those who really need to use it. Therefore, after detecting that the conference room is occupied for a period of time, the display device 160 will display a reminder message to notice the user occupying the conference room to leave as soon as possible, or to register for use. In other embodiments, when it is continuously detected that the user still occupies the conference room, the intelligent conference room system 100 is forced to switch to a sleep mode, and the devices in the conference room are turned off to save energy.

Figure 5:
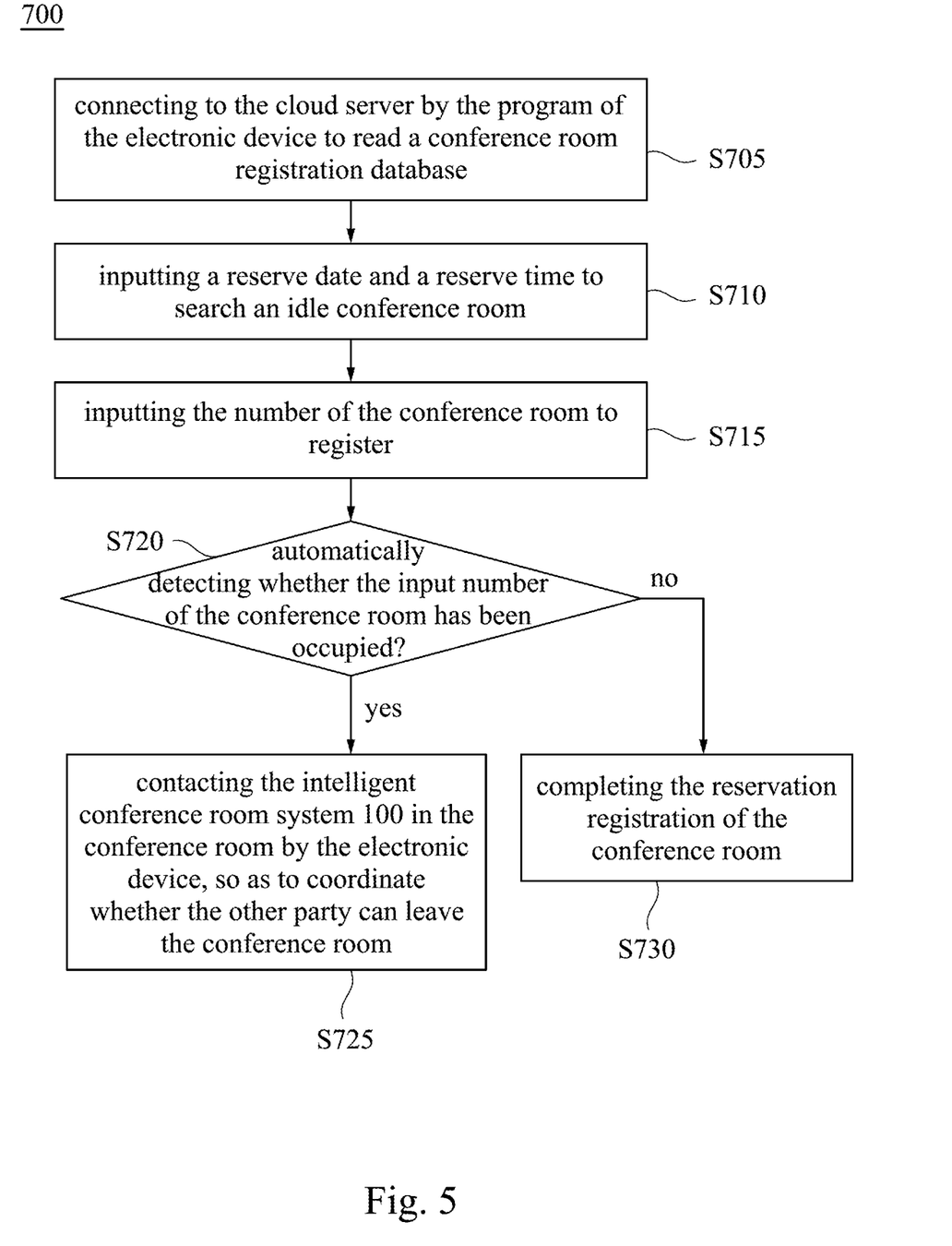
FIG. 5 is a flowchart illustrating a conference room intelligent management method in some embodiments of the present disclosure.

FIG. 5 is a flowchart illustrating a conference room intelligent management method 700 in some embodiments of the present disclosure. The conference room intelligent management method 700 is configured to manage the reserve registration of the conference room. For the convenience of explaining the conference room intelligent management method 700, please refer to the components in FIG. 1-FIG. 2 and the flowchart in FIG. 5 for the following paragraphs.

In step S705, connecting to the cloud server 400 by the program of the electronic device 300 to read a conference room registration database. In some embodiments, the user watch the registration status of the conference room through the user interface.

In step S710, inputting a reserve date and a reserve time to search an idle conference room. In some embodiments, the electronic device 300 obtains data from the conference room database for the user to perform subsequent registration.

In step S715, inputting the number of the conference room to register. In some embodiments, the user reserve the conference schedule and the participant list of the conference room through the electronic device 300. In other embodiments, the user can also directly enter one or more numbers of the conference room to reserve and register. For example, if it is a small meeting, the user directly registers a conference room. If it is a large conference, such as a conference for people from different departments, buildings, regions or countries, the user needs to reserve multiple conference rooms for the same conference.

In step S720, automatically detecting whether the input number of the conference room has been occupied. The management system 10 can be connected to the intelligent conference room system 100 corresponding by the number of the conference room, and determines whether the conference room is occupied by confirming whether the camera device 130, the lighting device 150, the action sensing device 170 and/or other devices are in operation.

If determining that the conference room is occupied in step 720, then performing step S725, contacting the intelligent conference room system 100 in the conference room by the electronic device 300, so as to coordinate whether the other party can leave the conference room. In some embodiments, when the user urgently reserves an upcoming conference, the user can reserve the conference room through step S720 and step S725 to efficiently communicate and coordinate with other users in the conference room. Accordingly, the user who reserves the conference room does not need to go to the conference room for a long time to check if anyone is there, and the user can complete the preparation of the conference room before the conference starts.

If determining that the conference room is not occupied in step 720, then performing step S730, completing the reservation registration of the conference room. In some embodiments, the conference data, the participants list and the contact information can be input in step S730.

Figure 6:
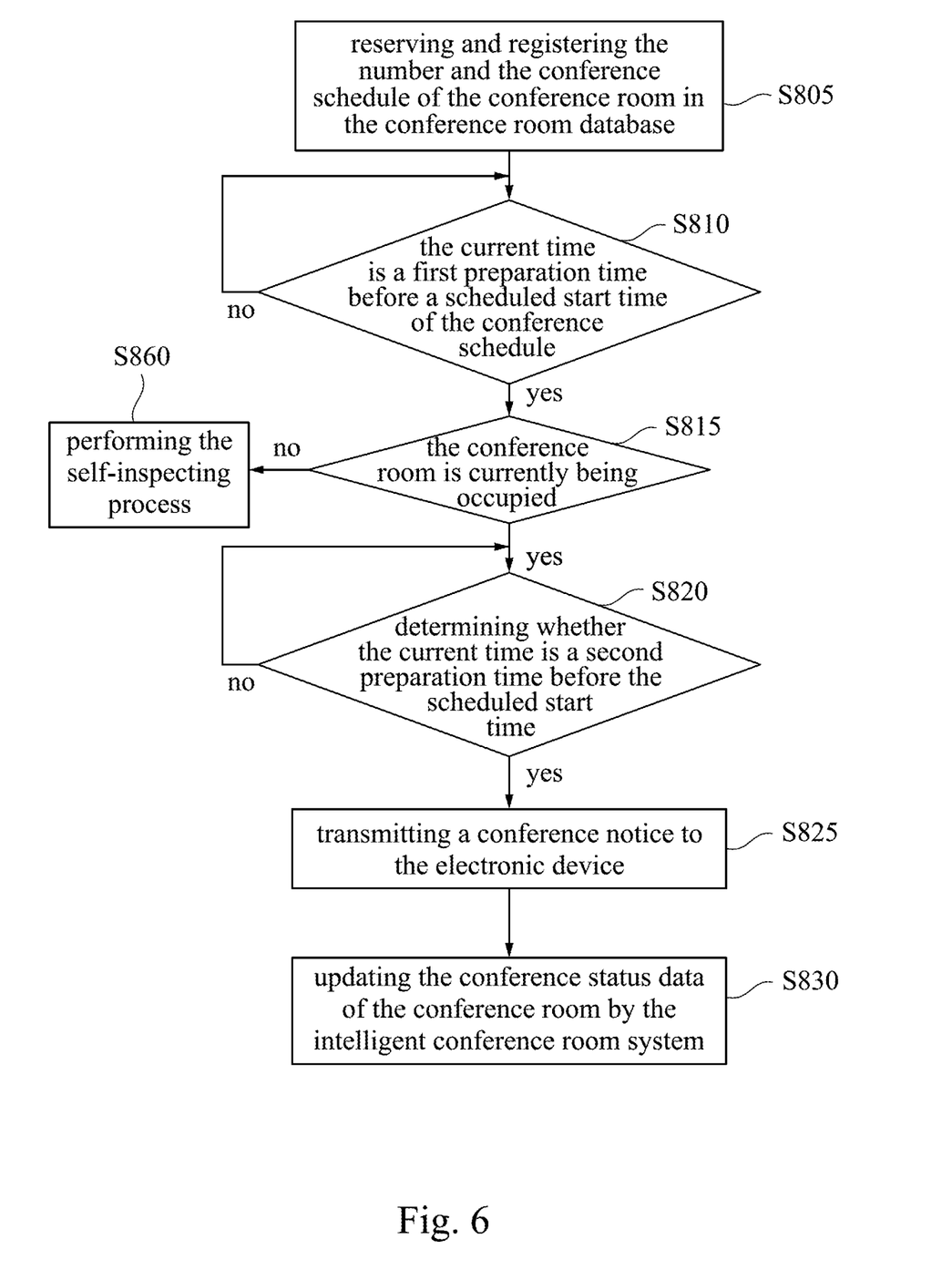
FIG. 6 is a flowchart illustrating a conference room intelligent management method in some embodiments of the present disclosure.

FIG. 6 is a flowchart illustrating a conference room intelligent management method 800 in some embodiments of the present disclosure. The conference room intelligent management method 800 is configured to automatically manage the procedures before the conference room is used. For example, the user reserves and registers a conference room, and reserves and registers the conference schedule and the participant list of the conference room in system. Here, "before the conference starts" is referred to as "before the conference room is used." The conference room intelligent management method in the present disclosure is for the procedures before, during, and about to end each conference. To facilitate the description of the conference room intelligent management method 800, please refer to the components in FIG. 1-FIG. 2 and the flowchart in FIG. 6 for the following paragraphs.

In step S805, reserving and registering the number and the conference schedule of the conference room in the conference room database. For example, the number of the conference room is M100, the conference schedule is 2020/05/21, 14:00. The procedure of reserve registration is as illustrated in FIG. 5, and will not be repeated here.

In step S810, determining whether the current time is a first preparation time before a scheduled start time of the conference schedule. In some embodiments, the first preparation time is 30 minutes. For example, the current time is 2020/05/21, 13:30, and the conference schedule is 2020/05/21, 14:00. In step S810, the cloud server 400 will trigger the following process 30 minutes before each conference.

In step S815, determining whether the conference room is currently being occupied. In some embodiments, the cloud server 400 read the number of the conference room and the conference schedule of the reserve registration data in the conference room database to determine whether there is a conference in the conference room currently. For example, if the reserve registration data shows that there is another conference in the conference room M100, then performing step S820. If there is currently no conference in the conference room M100, then performing step S860.

In step S820, determining whether the current time is a second preparation time before the scheduled start time of the conference schedule. In some embodiments, the second preparation time is 15 minutes. For example, the current time is 2020/05/21, 13:45, and the conference schedule is 2020/05/21, 14:00. In step S820, the cloud server 400 will trigger the following process 15 minutes before each meeting. In some embodiments, the second preparation time is less than the first preparation time.

In step S825, transmitting a conference notice to the electronic device 300. For example, The cloud server 400 can use the program to transmit a notification to the electronic device 300 according to the participant (e.g., participant devices) list recorded during reserve registration, to notice the participant that there will be a conference next.

In step S830, updating the conference status data of the conference room by the intelligent conference room system 100. In some embodiments, after the camera device 130 captures the participant image of the user entering the conference room, and performs image recognition, the personal data is obtained (e.g., the captured facial images are recognized through the pre-established employee personal data database to obtain employee information, such as employee number, contact information, etc.) The intelligent conference room system 100 will display the personal data on the display device 160. In some embodiments, the intelligent conference room system 100 records the personal data and the entry time in the conference status data so that other users can check the conference status.

It should be noted that, steps S825 and step S830 can be regarded as a set of steps, which are executed multiple times before the conference, so as to send out one or more conference reminders.

In some embodiments, the intelligent conference room system 100 transmits a conference reminder message at a third preparatory time before the conference, such as 5 minutes, to the electronic device 300 of the absentees (absentees device) to notify the participant that he/she will be absent. The third preparation time is less than the second preparation time.

Back to step S815, if there is currently no conference in the conference room M100, the intelligent conference room system 100 executes the self-inspecting process to eliminate the abnormality before the conference starts. The description of the self-inspecting process is as described in FIG. 3 above, and will not be repeated here. In some embodiments, if the self-inspecting process is completed without any abnormal problems, the conference room remains closed, and performing step S820.

Figure 7:
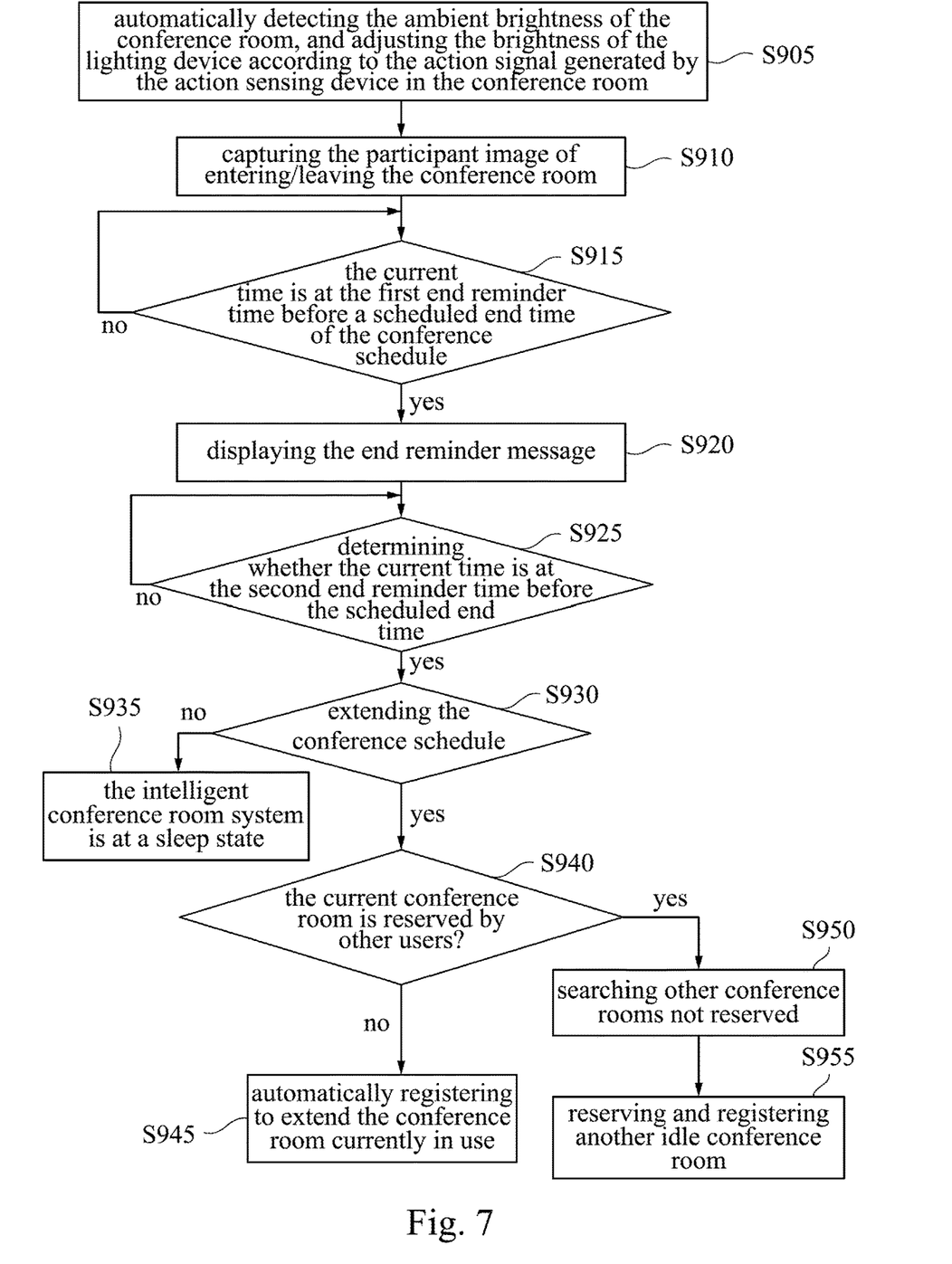
FIG. 7 is a flowchart illustrating a conference room intelligent management method in some embodiments of the present disclosure.

FIG. 7 is a flowchart illustrating a conference room intelligent management method 900 in some embodiments of the present disclosure. The conference room intelligent management method 900 is configured to automatically manage the procedures when the conference room is start to use and end to use. In order to facilitate the understanding of the conference room intelligent management method 900, please refer to the components in FIG. 1-FIG. 2 and the flowchart in FIG. 7 for the following paragraphs.

In step S905, the main-control device 110 controls the lighting device 150 to automatically detect the ambient brightness of the conference room and to adjust the brightness of the lighting device 150 according to the action signal generated by the action sensing device 170 in the conference room. In some embodiments, the camera device 130 captures the panoramic image in the conference room (e.g. a 360-degree camera), and use screen stitching technology to combine all facial images in the same screen. In some embodiments, the user can share the screen to the display device 160 through the electronic device 300 to instantly transmit the information to everyone in the conference room to watch, making the conference smoother.

In step S910, capturing the participant image of entering/leaving the conference room. In some embodiments, the intelligent conference room system 100 will continue to detect the participation status in the conference room, and record the user entering/leaving the conference room.

In step S915, determining whether the current time is at the first end reminder time before a scheduled end time of the conference schedule. In some embodiments, the first end reminder time is 15 minutes. For example, the current time is 2020/05/21, 15:45, and the scheduled the conference schedule section is 2020/05/21, 14:00-16:00. In some embodiments, if the current time is 15 minutes before the end of the meeting, performing step S920.

In step S920, displaying an end reminder message. In some embodiments, at 15 minutes before the scheduled end time of the conference schedule (the first end reminder time), the intelligent conference room system 100 outputs the end reminder message through the display device 160 and/or the electronic device 300 to notice the participants that the conference schedule of the conference room reserve (i.e., available time) is going to end, and participants need to make a conference summary as soon as possible.

In step S925, determining whether the current time is at the second end reminder time before the scheduled end time of the conference schedule. The second end reminder time is less than the first end reminder time. In some embodiments, the second end reminder time is 5 minutes. For example, the current time is 2020/05/21, 15:55, and the scheduled the conference schedule section is 2020/05/21, 14:00-16:00. In some embodiments, if the current time is before the end of the conference 5 minutes, then performing step S930.

In step S930, determining whether to extend the conference schedule. In some embodiments, the display device 160 shows an option to extend the conference schedule. If the conference schedule does not need to be extended, then performing step S935.

In step S935, the intelligent conference room system 100 is at a sleep state. In some embodiments, as the participants gradually leave the conference room, the intelligent conference room system 100 gradually turns off the power of the device, and will gradually reduce the brightness of the lighting device 150 until the lighting device 150 is completely turned off.

In step S930, if the participant needs to extend the conference, performing step S940. In step S940, determining whether the current conference room is reserved by other users. In some embodiments, the intelligent conference room system 100 stores reserve registration data at local. The intelligent conference room system 100 searches for whether the conference room is reserved in the next time according to the current time. For example, if the current time is 2020/05/21, 15:58, and the conference room used is number M100, then the intelligent conference room system 100 searches for whether the conference room M100 has been reserved after 16:00 on 2020/05/21. If the conference room is an idle conference room, performing step S945.

In step S945, the intelligent conference room system automatically registers to extend the conference room currently in use. In some embodiments, the intelligent conference room system 100 registers for a period of the conference schedule in the local database and/or the conference room database of the cloud server 400, such as 2020/05/21, 16:00-17:00. Therefore, the conference schedule can be extended automatically, without the need to perform the reservation procedure of the conference room in FIG. 4. In other words, the main-control device 110 is further configured to search other conference rooms not reserved when the conference room is reserved for the other conferences; and is further configured to search the other conference rooms not reserved in a database according to an extended use time to automatically reserve an available one of the other conference rooms.

In step S940, if the conference room is reserved by other users, performing step S950. In step S950, searching other conference rooms not reserved (e.g., idle conference rooms). In some embodiments, the cloud server 400 will search the conference room database based on the current time. For example, the current time is 2020/05/21, 15:58, the cloud server 400 searches for the idle conference room after 2020/05/21, 16:00.

In some embodiments, the cloud server 400 provides a general search mode and a cutting conference room mode. For example, the cloud server 400 searches for idle conference rooms based on a priority. The cloud server 400 can search the idle conference room according to the closest the conference room or the closest free time (e.g., the end time of all conference rooms is 16:30, so it can only reserve the conference room at 16:30 at the fastest). If an available one of conference rooms is searched, the subsequent conference schedule and related conference information will be copied from the intelligent conference room system 100 in the first conference room to the intelligent conference room system in the second conference room according to the idle conference room searched in the general search mode, so as to extend the subsequent conference to the newly registered second conference room. In this way, the reservation and registering another idle conference room of step S955 is completed.

In some other embodiments, the cloud server 400 can cut in line and register the conference room, which has been reserved, according to the conference level (e.g., the level of the conference, the level of the participant). In the cutting conference room mode, the user can communicate and coordinate with the intelligent conference room system in another conference room through the intelligent conference room system in the first conference room. After the coordination is completed, in the cutting conference room mode, the subsequent conference schedule and related conference information will be copied from the intelligent conference room system 100 in the first conference room to the intelligent conference room system in the cutting second conference room, so as to extend the subsequent conference to the newly registered second conference room. In this way, the reservation and registering another idle conference room of step S955 is completed.

In some embodiments, the present disclosure provides a non-transitory computer-readable recording medium for storing multiple codes. After the code is loaded into at least one of the intelligent conference room system 100, the gateway device 200, the electronic device 300 and the cloud server 400 as shown in FIG. 1, the code is executed at least one step of the conference room intelligent management method as shown in FIG. 3-FIG. 7.

Referring to FIG. 1, the electronic device 300 can be implemented but not limited to portable devices such as the electronic device, mobile devices, tablet computers, personal digital assistants (PDA), wearable devices, or notebook computers.

Referring to FIG. 1, the components of the management system 10 can transmit data through the network. The network may include a cable network, a wired network, an optical fiber network, a telecommunication network, an intranet, the Internet, a local area network (LAN), a wide area network (WAN), wireless local area network (WLAN), metropolitan network (MAN), public switched telephone network (PSTN), Bluetooth network, ZigBee network, near field communication (NFC) network or similar or any combination thereof.

Referring to FIG. 2, the communication device 180 can be implemented a device that supports Global System for Mobile communication (GSM), Long Term Evolution (LTE), 5th generation mobile networks, Worldwide interoperability for Microwave Access (WiMAX), Wireless Fidelity (Wi-Fi), IEEE 802.11 communication standard technology, Bluetooth technology or a wired network.

In some embodiments, the intelligent conference room system 100 further includes storage media (not shown) to at least store the conference room database. The storage medium can be implemented but not limited to random access memory (Random Access Memory, RAM) or non-volatile memory (such as flash memory), Read Only Memory (ROM), Hard Disk Drive (HDD), Solid State Drive (SSD) or optical storage, etc. The present disclosure is not limited to this.

As mentioned above, the management system, the intelligent conference room system and the conference room intelligent management method of the present disclosure provide to automatically detect whether the device is normal, to avoid the user wasting time to eliminate obstacles after the conference schedule starts. The participant does not need to worry about the hardware preparation of the conference room, let the technical operation of the conference room device return to the professional tester to handle. Participants only need to focus on the work content of the conference rather than the equipment in the conference room. In addition, a single tool software is required to achieve the overall method, such as device connection, device self-test, detection the reservation and occupancy of the conference room, conference notification and recording, and coordination of the conference room use. Compared with other conference notification system that require the use of an email system, the maintenance of the conference room device requires personnel to check in the conference room, the user of the present disclosure can execute the above methods only through the electronic device and the program, so as to improve the control and management of the conference room and the efficiency of the conference process, and improve the quality of the conference.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An conference room intelligent management method, comprising:
    executing, by a main-control device configured in a conference room, a self-inspecting process before a conference starts, wherein the self-inspecting process is configured to automatically detect a camera device, a radio device, a speaker and a lighting device arranged in the conference room, and operations of the self-inspecting process comprises:
    controlling a display device to display a self-inspecting image, and controlling the camera device to capture a testing image corresponding to the self-inspecting image;
    determining whether the camera device is abnormal according to the self-inspecting image and the testing image, and generating a abnormal testing signal when determining the camera device is abnormal;
    controlling the speaker to generate a self-inspecting audio signal, and controlling the speaker to receive a sampling audio signal corresponding to the self-inspecting audio signal;
    determining whether the speaker is abnormal according to the sampling audio signal and the self-inspecting audio signal, and generating the abnormal testing signal when determining the speaker is abnormal; and
    transmitting the abnormal testing signal to an electronic device to notify, and removing an abnormal situation of the conference room device before the conference starts.

2. The conference room intelligent management method of claim 1, wherein operations of the self-inspecting process further comprises:
    controlling the display device to generate a instruction message to be followed by a tester to perform an action accordingly; and
    determining, by the main-control device, whether an action signal corresponding to the action is received by an action sensing device arranged in the conference room, so as to determine whether the action sensing device is abnormal.

3. The conference room intelligent management method of claim 1, wherein operations of the self-inspecting process further comprises:
    controlling the camera device to capture a panoramic image of the conference room to analyze an ambient brightness and a color temperature of the conference room, and controlling a brightness and a color temperature of the lighting device to adjust the ambient brightness and the color temperature of the conference room to a target value.

4. The conference room intelligent management method of claim 1, further comprising:
    reserving, by the electronic device, a conference schedule and a participant list of the conference room; and
    removing, by the main-control device performing the self-inspecting process, the abnormal situation of the conference room device before the conference starts at a first preparation time when the conference room is not reserved for other conferences, wherein the first preparation time is before a scheduled start time of the conference schedule.

5. The conference room intelligent management method of claim 4, further comprising:
    transmitting a conference notice to a plurality of participant devices at a second preparation time before the scheduled start time, wherein the second preparation time is less than the first preparation time.

6. The conference room intelligent management method of claim 5, further comprising:
    capturing, by the camera device, a entry time and a participant image of the conference room to obtain a personal data, and recording the personal data and the entry time to a conference status data to update a conference status of the conference room.

7. The conference room intelligent management method of claim 6, further comprising:
    comparing the conference status data with participant list at a third preparation time before the scheduled start time, so as to transmit a conference reminder message to an absentees device, wherein the third preparation time is less than the second preparation time.

8. The conference room intelligent management method of claim 7, further comprising:
    capturing, by the camera device, the participant image of entering and leaving the conference room continuously during the conference schedule; and
    updating, by the main-control device, the conference status data continuously according to the personal data corresponding to the participant image.

9. The conference room intelligent management method of claim 7, further comprising:
    controlling, by the main-control device, the lighting device to detect an ambient brightness of the conference room and automatically adjust a brightness of the lighting device according to an action signal generated by an action sensing device arranged in the conference room during the conference schedule.

10. The conference room intelligent management method of claim 4, further comprising:
    outputting, by the display device, an end reminder message to notify that an available time of the conference room is going to end at a first end reminder time, wherein the first end reminder time is before a scheduled end time of the conference schedule of the conference room; and outputting, by the display device, an option configured to extend to use the conference room when the conference room is not reserved for the other conferences after the scheduled end time.

11. The conference room intelligent management method of claim 10, further comprising:

searching other conference rooms not reserved when the conference room is reserved for the other conferences after the scheduled end time; and searching the other conference rooms not reserved in a database according to an extended use time to automatically reserve an available one of the other conference rooms.

12. An intelligent conference room system, comprising:
a camera device;
a radio device;
a speaker;
a lighting device; and
a main-control device, communicatively connected to the camera device, the radio device, the speaker and the lighting device, wherein the main-control device, the camera device, the radio device, the speaker and the lighting device are arranged in a conference room, the main-control device is configured to execute a self-inspecting process before a conference starts to automatically detect the camera device, the radio device, the speaker and the lighting device, wherein the main-control device is configured to:

control a display device to display a self-inspecting image, and control the camera device to capture a testing image corresponding to the self-inspecting image;

determine whether the camera device is abnormal according to the self-inspecting image and the testing image, and generate a abnormal testing signal when determining the camera device is abnormal;

control the speaker to generate a self-inspecting audio signal, and control the speaker to receive a sampling audio signal corresponding to the self-inspecting audio signal;

determine whether the speaker is abnormal according to the sampling audio signal and the self-inspecting audio signal, and generate the abnormal testing signal when determining the speaker is abnormal; and transmit the abnormal testing signal to an electronic device to notify, and removing an abnormal situation of the conference room device before the conference starts.

13. The intelligent conference room system of claim 12, wherein the main-control device is further configured to:
control the display device to generate a instruction message to make a tester performs an action according to the instruction message; and
determine whether an action signal corresponding to the action is received by an action sensing device arranged in the conference room, so as to determine whether the action sensing device is abnormal.

14. The intelligent conference room system of claim 12, wherein the main-control device is further configured to:
control the camera device to capture a panoramic image of the conference room to analyze an ambient brightness and a color temperature of the conference room; and control a brightness and a color temperature of the lighting device to adjust the ambient brightness and the color temperature of the conference room to a target value.

15. The intelligent conference room system of claim 12, wherein the electronic device is configured reserve a conference schedule and a participant list of the conference room; and the main-control device performs the self-inspecting process to remove the abnormal situation of the conference room device before the conference starts at a first preparation time when the conference room is not reserved for other conferences, and the first preparation time is before a scheduled start time of the conference schedule.

16. The intelligent conference room system of claim 15, wherein the main-control device is further configured to:
transmit a conference notice to a plurality of participant devices at a second preparation time before the conference schedule, wherein the second preparation time is less than the first preparation time.

17. The intelligent conference room system of claim 16, wherein the camera device is configured to capture a entry time and a participant image of the conference room to obtain a personal data, and is configured to record the personal data and the entry time to a conference status data to update a conference status of the conference room.

18. The intelligent conference room system of claim 17, wherein the main-control device is further configured to:
compare the conference status data with participant list at a third preparation time before the scheduled start time of the conference schedule, so as to transmit a conference reminder message to an absentees device, wherein the third preparation time is less than the second preparation time.

19. The intelligent conference room system of claim 18, wherein the camera device is configured to capture the participant image of entering and leaving the conference room continuously during the conference schedule, and the main-control device is configured to update the conference status data continuously according to the personal data corresponding to the participant image.

20. The intelligent conference room system of claim 18, further comprising:
an action sensing device, arranged in the conference room, and coupled to the main-control device, wherein the action sensing device is configured to generate an action signal; and
wherein the main-control device is further configured to control the lighting device to detect an ambient brightness of the conference room and automatically adjust a brightness of the lighting device when receiving the action signal.

21. The intelligent conference room system of claim 15, wherein the main-control device is further configured to:
output an end reminder message on the display device to notify that an available time of the conference room is going to end at a first end reminder time, wherein the first end reminder time is before a scheduled end time of the conference schedule of the conference room; and
output an option on the display device when the conference room is not reserved for the other conferences after the scheduled end time, wherein the option is configured to extend to use the conference room.

22. The intelligent conference room system of claim 21, wherein when the conference room is reserved for the other conferences after the scheduled end time, the main-control device is further configured to:

search other conference rooms not reserved when the conference room is reserved for the other conferences; and search the other conference rooms not reserved in a database according to an extended use time to automatically reserve an available one of the other conference rooms.

* * * * *